Dec. 8, 1959    G. F. QUAYLE    2,916,294
WIDE ANGLE STEERING MECHANISM FOR INDUSTRIAL TRUCKS
Filed Aug. 2, 1957    4 Sheets-Sheet 1

INVENTOR.
GEORGE F. QUAYLE
BY
A. H. Golden
ATTORNEY

Dec. 8, 1959          G. F. QUAYLE          2,916,294
WIDE ANGLE STEERING MECHANISM FOR INDUSTRIAL TRUCKS
Filed Aug. 2, 1957          4 Sheets-Sheet 2
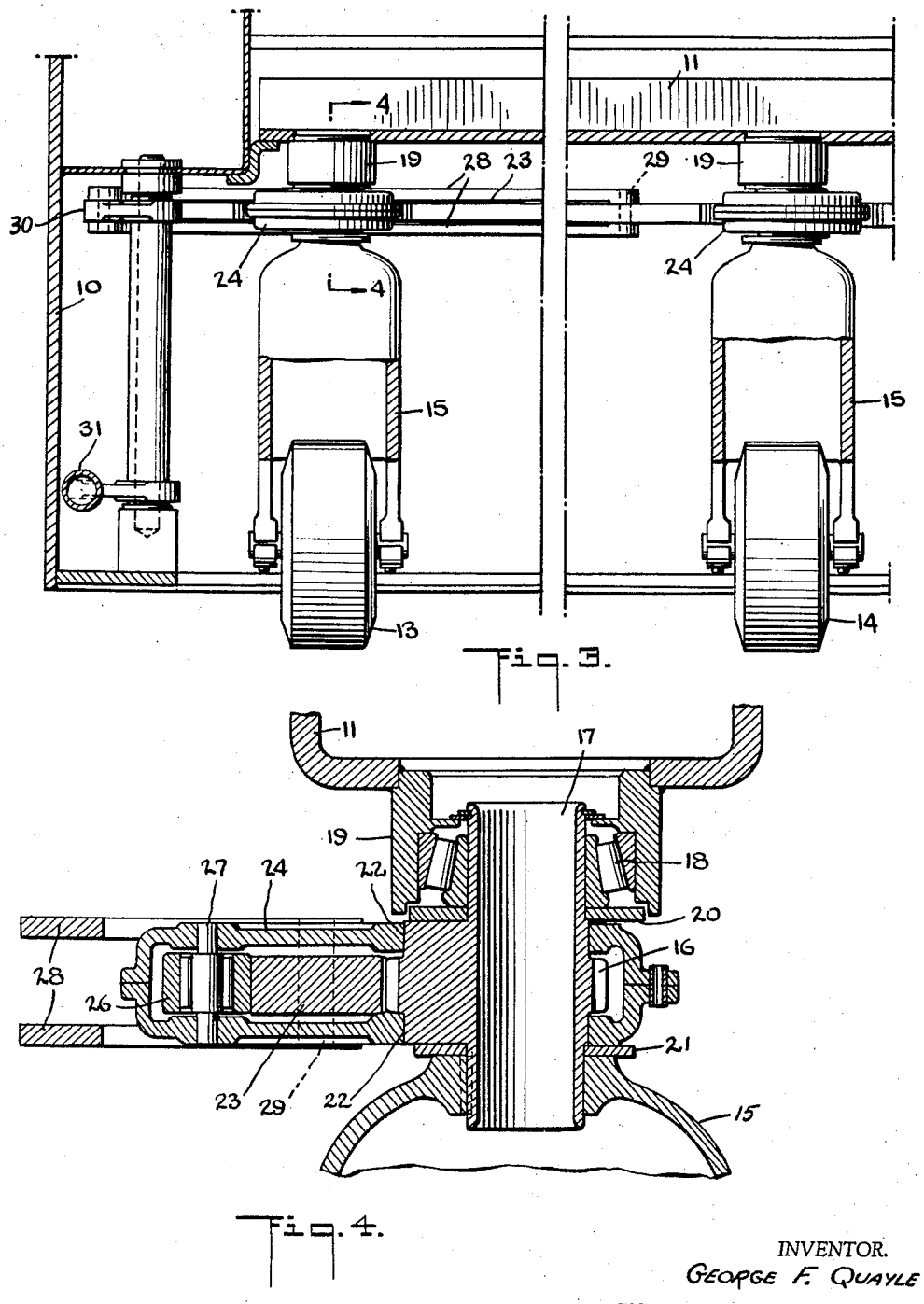
INVENTOR.
GEORGE F. QUAYLE
BY
H. H. Golden
ATTORNEY

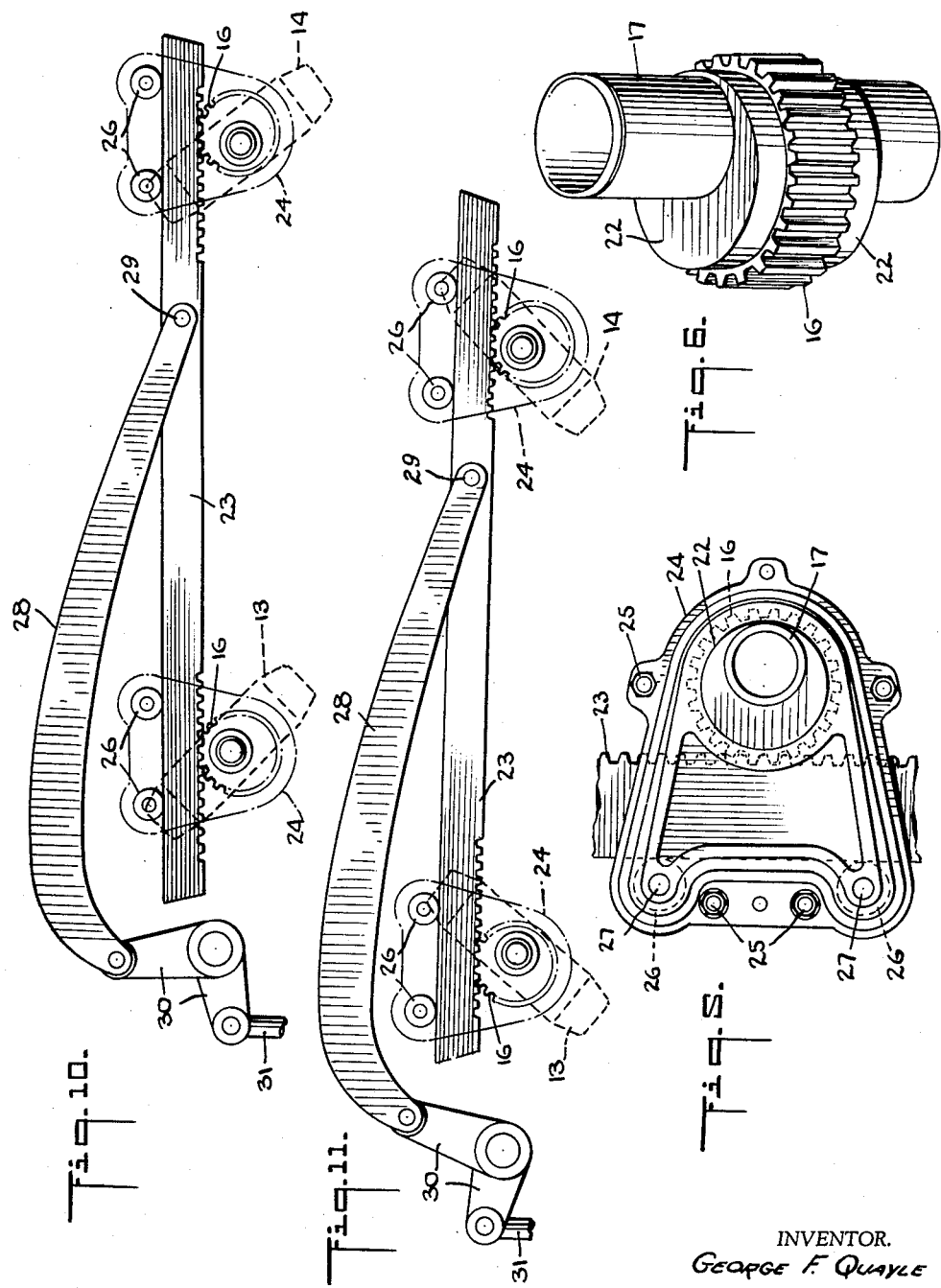

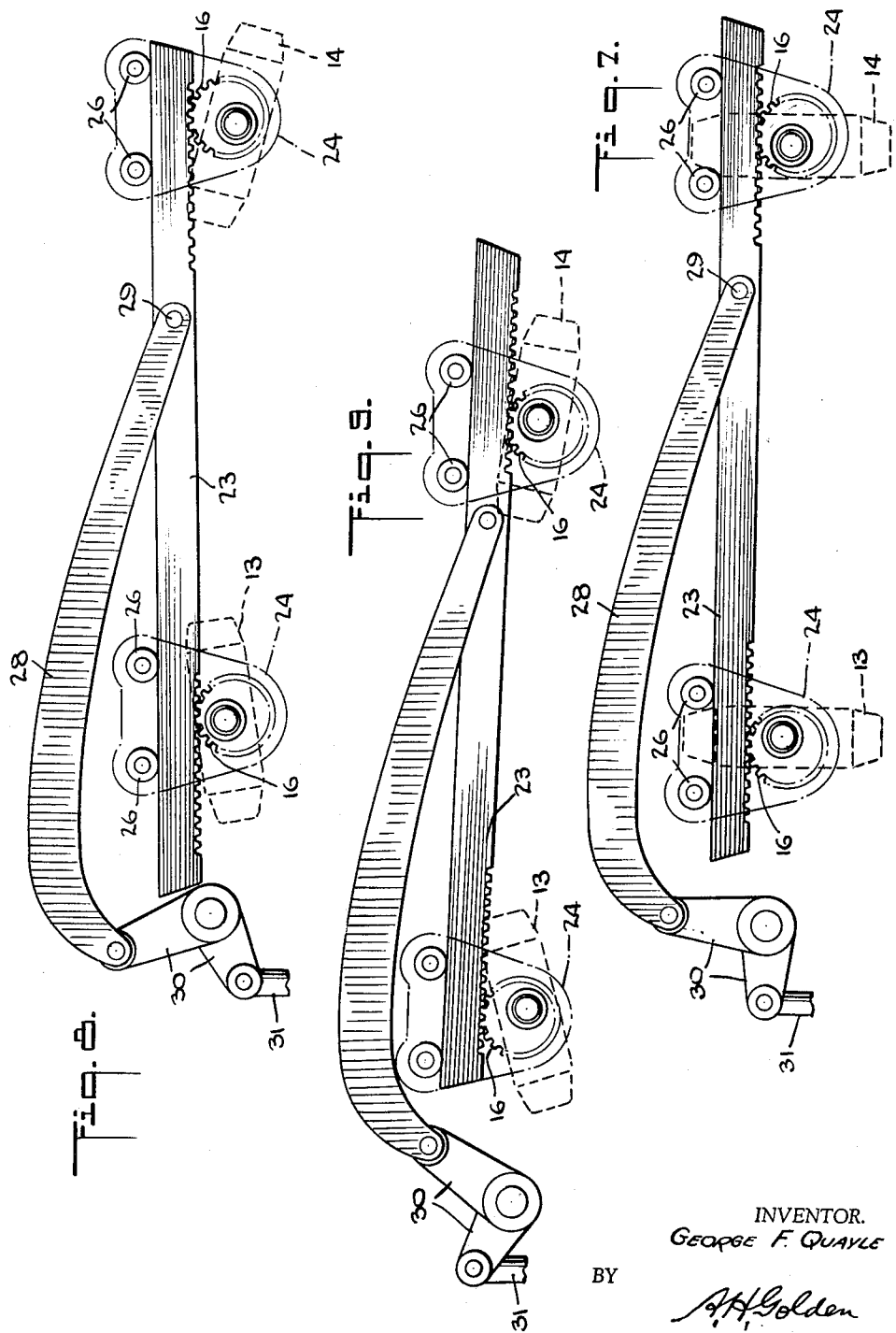

United States Patent Office 2,916,294
Patented Dec. 8, 1959

2,916,294

WIDE ANGLE STEERING MECHANISM FOR INDUSTRIAL TRUCKS

George F. Quayle, Philadelphia, Pa., assignor to The Yale & Towne Manufacturing Company, Stamford, Conn., a corporation of Connecticut Application August 2, 1957, Serial No. 675,842

2 Claims. (Cl. 280—93)

This invention relates to steering mechanism for an industrial truck. Those persons skilled in the art will appreciate that industrial trucks, to be used to best advantage, should be capable of steering very sharply. However, a very considerable problem is involved in designing a steering mechanism that will rotate two steering wheels of a truck through a sufficiently wide angle to steer the truck sharply, and yet contribute geometric steering. The most simple means to use for steering truck wheels with the proper geometry are standard links. However, standard links will not allow sharp steering, and certainly cannot be used if the wheels are to move 180°.

It is possible to obtain geometric wide angle steering through the use of rather complex means involving complex gearing and other means, and such constructions are now in use. My invention is directed toward the use of simple gear operated means to contribute geometric steering. The usual gear means will yield equal angle steering that is not geometrically correct, since the wheels will not move correctly when steered, and at least one of the wheels will slide sidewise on the ground when the truck is moved. I have conceived a novel steering mechanism that enables me to achieve very satisfactory geometric steering, but that also makes possible the steering of the wheels through a very wide angle, that angle actually being more than 180°. While accomplishing these things, my mechanism requires few parts and is in fact rather simple.

In my novel steering mechanism, I utilize a pair of gears, each imparting steering rotation to one steering wheel on the truck, with operating means that rotate both gears. As a feature of my invention, each of the gears has a periphery that is in eccentric relation to the axis in which the gear rotates. Then I arrange the operating means to contact the gear peripheries in such a way as to rotate one gear through a greater angle than the other gear, enabling me to effect geometric steering of the truck.

As a further feature, the operating means in the construction that I propose has a rack in contact with both eccentric gears. That rack is so assembled and held relatively to the gear peripheries that the gears are in angular relation to one another. The rack can then steer both wheels through 180°, or even more than 180°. Nevertheless, the wheels will be maintained in proper geometric relation to one another so that each wheel on the truck will move easily in its particular tracking relation to the ground.

As a more detailed feature of my invention, my novel steering mechanism has means so guiding the rack that the rack, when moving longitudinally to rotate the eccentric gears, will also move relatively to the axis in which each gear rotates. Thereby I maintain the rack in operating relation to each of the eccentric gears in all positions of those gears.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 3 is a vertical section on the line 3—3 in Fig. 2.

Fig. 4 shows parts of my mechanism in section, on the line 4—4 in Fig. 3.

Fig. 5 is a plan view of parts shown in Fig. 4.

Fig. 6 shows the gear member in detail.

Fig. 7 is a plan view showing somewhat diagrammatically the position of my mechanism when the truck wheels are steered in a forward direction.

Figs. 8 and 9 are like Fig. 7 but show the wheels steered at extreme angles to the left and to the right, respectively.

Figs. 10 and 11 show the mechanism as it appears when the wheels are steered less sharply to the left and to the right, respectively.

Figure 1:
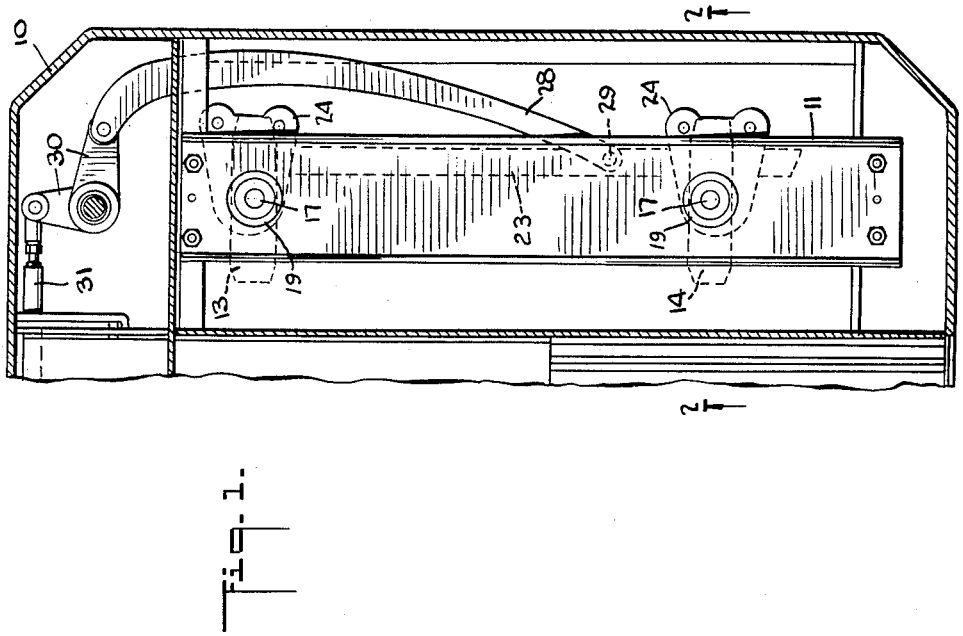
Fig. 1 is a partial horizontal section through one end of a truck and shows my novel steering mechanism utilized on an industrial truck.
Figure 2:
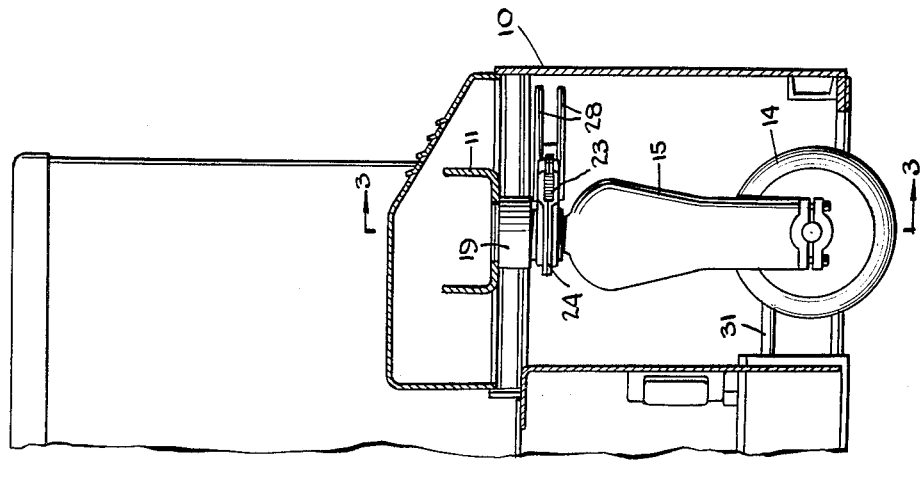
Fig. 2 is a vertical cross-section on the line 2—2 in Fig. 1.

For the purpose of describing my invention, I show in Figs. 1, 2 and 3 of the drawings a portion of an industrial truck that has a main frame 10, with a transverse frame member 11 through which a pair of steering wheels 13, 14 are mounted relatively to the truck. Each of the steering wheels 13, 14 is supported on a wheel mounting 15 that is in turn mounted to rotate on frame member 11, so that each wheel will have steering rotation in a particular axis, as is rather usual in industrial trucks. I believe it will be unnecessary to describe the further details of the truck, since those details are not important to an understanding of the novel steering mechanism that forms the subject of this application.

In my invention, each wheel mounting 15 is constructed for rotation with a novel gear 16, one of those gears being well shown in Figs. 4, 5 and 6 of the drawings. Each gear 16 is integral with a sleeve shaft portion 17 through which each wheel mounting 15 rotates relatively to the truck as I shall presently describe. Thus, as best seen in Fig. 4, wheel mounting 15 is keyed to the lower end of the shaft portion 17, while the upper end of shaft portion 17 rotates on a roller bearing 18 that is supported in a circular part 19 welded to the truck frame member 11. I may utilize thrust washers 20, 21 on opposed ends of the gear 16, but that is not essential.

As is clearly shown, I form each gear 16 with a toothed circular periphery that is in eccentric relation to its shaft portion 17. Also, at least one end of each gear 16 has a cam 22 that is formed on the gear center, whereby to have the same eccentricity relatively to shaft 27 as does the gear periphery. It is conceivable, of course, that I may make gear 16 and cams 22 separate from the shaft portion 17, and then secure them to the shaft portion, but I do prefer to form the gear, cams and shaft integrally. In either case, it is important to realize that each gear 16 rotates with its wheel mounting 15, and that the eccentric gear periphery and cams 22 also move relatively to the axis of rotation.

My novel steering mechanism has also a rack 23 for rotating both gears 16. To describe the means whereby I hold the rack 23 in contact with the eccentric periphery of each gear 16, I shall refer particularly to Figs. 4 and 5 of the drawings. I utilize a guide frame 24 that may very well include opposed parts that are assembled at opposed ends of gear 16, Fig. 4, and that are secured to one another through bolts 25, Fig. 5. The guide frame 24 has openings with surfaces that are engaged about the cams 22 as is well shown in Fig. 4, so that those cams when rotating will move the guide frame 24 relatively to the axis in which the particular gear 16 rotates. Further, the guide frame 24 will be supported through its engagement with the cams 22 and gear 16. A portion of the guide frame 24 extends about the rack 23 and supports the rack for sliding while in contact with the eccentric periphery of the gear 16. At the opposed side of rack 23, I equip the guide frame 24 with a pair of rollers 26 that rotate on pins 27, those rollers holding the rack relatively to the gear 16. The rollers 26 are arranged to coact with the rack 23 at points that are in spaced relation to one another, so that the rack will act against rollers 26 to hold the guide frame 24 against rotation with the gear 16.

From the description that I have thus far made, I believe it will be understood that the rack 23 when moving will rotate each of the gears 16 whereby to steer the truck wheels 13, 14. Further, each guide frame 24 by moving on the cams 22 will move the rack 23 relatively to the axis in which the particular gear 16 rotates, thus compensating for the eccentricity of the gear and holding the rack in contact with the gear in any position to which the gear rotates. That enables me not only to effect steering through an angle that is virtually unlimited, but also to maintain a geometric steering relation between the wheels as I shall now describe.

Thus, if we refer particularly to Fig. 7 of the drawings, it will be seen that I so arrange the gears 16 that each of those gears lies in a different angular relation to the axis in which it rotates. More particularly, with the wheels 13, 14 steered in a forward direction, as in Fig. 7, the gears 16 are in different eccentric relation to the steering wheels 13, 14.

The steering effect that I achieve will easily be understood when considering Figs. 8 and 9 of the drawings. Thus, if we assume that the rack 23 steers the wheels 13, 14 to the left, as in Fig. 8, it will be seen that the particular eccentric relation of the gears 16 will cause the wheel 13 to rotate through a considerably larger angle than does the wheel 14. Further, as represented in Fig. 8, it is possible to steer the wheels 13, 14 through an exceedingly large angle that may be considerably more than 180°. Therefore, I am able to effect geometric steering of the truck, despite the fact that I can steer the truck very sharply.

If we assume that the wheels 13 and 14 are steered to the right, as in Fig. 9, the action will be the same as in Fig. 8, but with the positions of the wheels 13, 14 and eccentric gears 16 reversed relatively to the positions shown in Fig. 8. When the wheels 13, 14 are steered less sharply, as in Figs. 10 and 11, the gears 16 will still cause the wheels to rotate in such relation to one another as to effect geometric steering of the truck.

Those persons skilled in the art will understand that I may use any suitable means for actuating the steering rack 23. Merely for the purpose of disclosure, I show a drag link 28 that is pivoted to rack 23 through a pin 29, the drag link 28 being operated through bell crank levers 30 and a steering rod 31. Of course, it is within the scope of my invention to utilize hydraulic rams, gears or other actuating means for moving the rack 23.

I believe that those persons skilled in the art will now understand that I have conceived an extremely novel mechanism for effecting geometric steering of a truck. Through my invention, I not only effect geometric steering, but I am able to steer the wheels through an exceedingly wide angle that may actually be greater than 180°. Despite the fact that my steering mechanism is exceedingly effective, it actually is quite simple and requires relatively few parts. It will be appreciated, therefore, that my novel truck steering mechanism has a very considerable value, and I believe that the merits of my invention will be fully appreciated.

I now claim:

1. In a truck of the class described, a pair of steering wheels at opposed sides of the truck, means mounting each steering wheel for steering rotation about a vertical axis passing through the vertical diameter of each wheel, said means including a portion rotating with each wheel about its said axis, a gear fixed to said portion of the mounting means for each wheel in eccentric relation to the steering axis of the wheel and through which the wheel is steered, the eccentric gear of one wheel being in a different eccentric position relatively to its wheel than the gear of the other wheel when both wheels are in a forward steering position, a rack moving transversely of the truck and having toothed portions that are formed in aligned relation to one another, guide means for holding one aligned toothed portion of the rack in meshing relation to the teeth of each gear, and a cam rotating with each eccentric gear and coacting with said guide means to move the corresponding toothed portion of the rack relatively to that gear while guiding the rack relatively to the opposed eccentric gear, so that the rack while acting in the same linear direction relatively to both eccentric gears will rotate each wheel about its vertical diameter whereby to effect geometric steering of the wheels through a very wide angle.

2. In a truck of the class described, a pair of steering wheels at opposed sides of the truck, means mounting each steering wheel for steering rotation about a vertical axis passing through the vertical diameter of each wheel, so that said diameter of each wheel will remain in a predetermined position relatively to the truck as the wheel is steered, said means supporting each wheel for steering through 180° and including a portion rotating with each wheel about its steering axis, a gear fixed to said portion of the mounting means for each wheel in eccentric relation to the steering axis of the wheel and through which the wheel is steered, the eccentric gear of one wheel being in a different eccentric position relatively to its wheel than the gear of the other wheel when both wheels are in a forward steering position, a rack moving transversely of the truck and having toothed portions formed in aligned relation to one another with one toothed portion adapted to coact with each of said eccentric gears, a guide member for each toothed portion of the rack, and cams rotating with the eccentric gears and moving the guide members to hold the aligned toothed portions of the rack in meshing relation to the gears as the gears rotate through 180°, so that the rack while acting in the same linear direction relatively to both eccentric gears will rotate each wheel about its vertical diameter whereby to effect geometric steering of the wheels through a very wide angle.

References Cited in the file of this patent

UNITED STATES PATENTS

| | | |
|---|---|---|
| 1,476,068 | Froelich | Dec. 4, 1923 |
| 1,545,117 | Baldwin et al. | July 7, 1925 |
| 2,485,792 | Van Voorhis | Oct. 25, 1949 |
| 2,509,161 | Meyers | May 23, 1950 |